United States Patent
Jain et al.

(10) Patent No.: US 10,185,524 B2
(45) Date of Patent: Jan. 22, 2019

(54) PRINT RESERVATION (71) Applicant: Hewlett-Packard Development Company, L.P., Houston, TX (US)

(72) Inventors: Dhanendra Jain, Kota (IN); Gurpreet Singh Bhatia, Gurgaon (IN); Kumaravel Ganesan, Dindigul (IN); Ritesh Ranjan Jha, Bangalore (IN); Puneet Kumar Arora, New Delhi (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/544,684

(22) PCT Filed: Oct. 20, 2015

(86) PCT No.: PCT/US2015/056345
§ 371 (c)(1),
(2) Date: Jul. 19, 2017

(87) PCT Pub. No.: WO2016/160065
PCT Pub. Date: Oct. 6, 2016

(65) Prior Publication Data
US 2017/0364315 A1  Dec. 21, 2017

(30) Foreign Application Priority Data

Mar. 31, 2015 (IN) .......................... 1704/CHE/2015

(51) Int. Cl.
*G06F 3/12* (2006.01)

(52) U.S. Cl.
CPC .......... *G06F 3/1239* (2013.01); *G06F 3/1204* (2013.01); *G06F 3/1205* (2013.01); *G06F 3/126* (2013.01); *G06F 3/1236* (2013.01); *G06F 3/1238* (2013.01); *G06F 3/1274* (2013.01); *G06F 3/1288* (2013.01)

(58) Field of Classification Search
CPC .... G06F 3/1239; G06F 3/1238; G06F 3/1237; G06F 3/126; G06F 3/1288
USPC ........................ 358/1.15, 1.14; 707/629, 632
See application file for complete search history.

(56) References Cited

U.S. PATENT DOCUMENTS

| | | |
|---|---|---|
| 5,819,047 A | 10/1998 | Bauer et al. |
| 6,985,244 B1 | 1/2006 | Bhogal et al. |
| 7,385,720 B2 | 6/2008 | Bhatti |
| 7,962,050 B2 | 6/2011 | Shustef et al. |

(Continued)

FOREIGN PATENT DOCUMENTS

EP  1696310 A2  8/2006

OTHER PUBLICATIONS

Masuda, H. et al., "Requirements and Implementation of Printing Subsystem in Educational Computer System," Dec. 14, 2001, 7 pages, http://www27.cs.kobe-u.ac.jp.

*Primary Examiner* — Jamares Q Washington
(74) *Attorney, Agent, or Firm* — HP Inc. Patent Department (57) ABSTRACT

A print server may include a processor, a memory, and instructions stored on the memory and executable by the processor. In an example, the instructions may include: a print subscription component to control printing by a print subscription user according to a first printing quota associated with the print subscription user, and a print reservation component to reserve a second printing quota from the first printing quota for scheduled printing.

12 Claims, 5 Drawing Sheets

(56) References Cited

U.S. PATENT DOCUMENTS

| | | | |
|---|---|---|---|
| 8,149,449 B2 | 4/2012 | Ota | |
| 8,229,314 B2 | 7/2012 | Shustef | |
| 8,380,889 B2 | 2/2013 | Sretenovic | |
| 8,836,977 B2 | 9/2014 | Wu et al. | |
| 2008/0186530 A1* | 8/2008 | Kurozasa | G06F 3/1204 358/1.15 |
| 2008/0273224 A1 | 11/2008 | Maulsby et al. | |
| 2009/0080022 A1* | 3/2009 | Tsutsumi | G06F 3/1204 358/1.15 |
| 2013/0155441 A1 | 6/2013 | Hong et al. | |
| 2013/0308147 A1* | 11/2013 | Wu | G06F 3/1203 358/1.13 |
| 2015/0039357 A1* | 2/2015 | Segal | G06Q 10/06314 705/5 |

* cited by examiner

FIG. 6
- 601: recording a first printing quota
- 602: receiving a request to subscribe to a print reservation service
- 603: reserving a second printing quota from the first printing quota

PRINT RESERVATION

BACKGROUND

With the development of various networks, print job may also be deployed over networks. Users may use computing devices and associated applications to command a printer to print specific documents or other application content via a network. In this way, the printer may be shared among multiple network users. Accordingly, an intermediary print server may be required to manage printing between users and printers.

A print server may be a device that connects printers to client computers over a network. It accepts print jobs from the computers, sends the print jobs to the appropriate printers, and queues the print jobs locally to accommodate the fact that work may arrive more quickly than a printer can actually handle.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which components or procedures shown in the figures are not necessarily essential for implementing the present disclosure. In other instances, well-known methods, procedures, modules, and circuits have not been described in detail so as not to unnecessarily obscure features of the examples.

Figure 1:
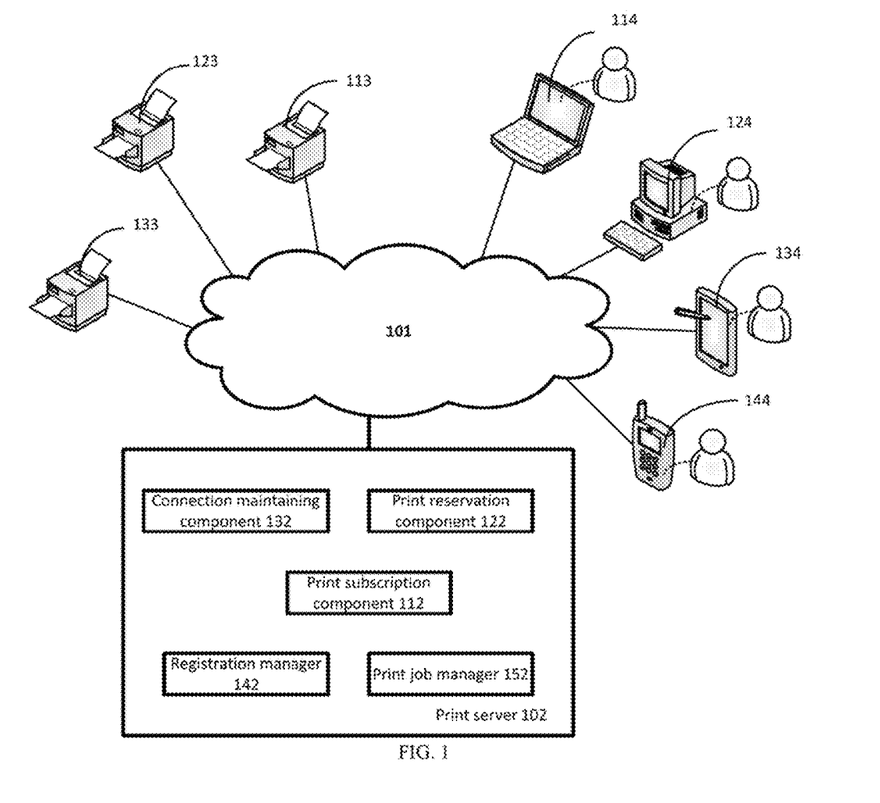
FIG. 1 is a schematic diagram illustrating a system for providing printing capabilities in accordance with an example of the present disclosure.

In an example, a system may be provided for implementing printing over a network. FIG. 1 is a schematic diagram of a system using a print server 102 for providing printing capabilities of printers to example user terminals 114, 124, 134, 144 via a network 101. The print server 102 may be able to manage a plurality of printers, such as printers 113, 123, 133. In an example, the printer in FIG. 1 is a device that may be utilized to print content on a physical medium, such as paper or a layer of powder-based build material. In the latter case, a printer may utilize the deposition of consumable fluids in a layer-wise additive manufacturing process. A printer may utilize suitable consumable, such as ink, toner, fluids or powders, or other raw material for printing. In an example, the printer may be a three dimensional (3D) printer. The raw material for 3D printing may include plastics, metals, nylon, glass-filled polyamide, epoxy resins, wax, and photopolymers, etc.

In an example, the network 101 may be the public Internet or other wide area public or private network, or a combination thereof. In further examples, the network 101 may be a corporate or other intranet, and/or a smaller-scale, local or personal network, any of which (and/or combinations thereof) may be implemented using standard network technology.

In an example, the print server 102 may include a print subscription component 112 and a print reservation component 122. In an example, the print server 102 may further include a connection maintaining component 132. In another example, the print server 102 may further include a registration manager 142 and a print job manager 152. Here, "component" may refer to machine-readable instructions executable by a processor and stored on a machine-readable storage medium, for implementing respective functions.

In an example, the print subscription component 112 may keep track of the following information for an enrollment of a print subscription user, number of pages consumed under a main quota of pages within a predetermined time period, and print consumption. In an example, the print consumption may be cartridge ink consumption, toner consumption, etc. The specific time period may be a month, half a year, or a year, or any other suitable period, which can be set according to the option of the print subscription user. In an example, the print subscription user may be a user that has subscribed the main quota of printing pages on the print server 102. Based on the print consumption, it is able to know when to deliver replacement of printing consumables to the print subscription user. Also, the print subscription component 112 may have the capability to block further printing on a printer if the main quota has been used up by the print subscription user, without further payments for additional quota. In other words, the amount of printouts of the print subscription user within a particular period of time may be limited.

In an example, the print reservation component 122 may utilize capabilities of the print server 102 to manage a sub-quota out of the main quota available to the print subscription user. The sub-quota may be considered as a reserved quota for scheduled printing. In an example, the management may include creating a sub-quota for print reservation, modifying the sub-quota, and deleting the sub-quota. The management may create the experience of reserving or blocking corresponding number of pages for the scheduled printing, such as specific print jobs or content. In an example, an external printing application may be allowed to subscribe to or unsubscribe from a print reservation service provided by the print server 102. Upon subscription, the printing application may use the print reservation component 122 to create, modify, or delete the sub-quota out of the main quota available to the print subscription user. For example, if the user cancels a specific printing, then the printing application may delete the sub-quota so that the sub-quota may be freed up to be used for common purpose of the print subscription user.

In an example, the external printing application may be installed in a user terminal such as a notebook computer 114, a desktop computer 124, a tablet computing device 134, a smart phone 144, etc. The printing application may be compatible with a print subscription service and used to subscribe to a print reservation service over the print server 102. In an example, the printing application may supervise print requirements of the print subscription user.

In an example, the connection maintaining component 132 may maintain connections for transmitting notifications and commands between the printers 113-133 and the print server 102. In an example, the connection may be a persistent connection such as an Extensible Messaging and Presence Protocol (XMPP) connection.

In an example, the registration manager 142 may manage the registration of a printer. For example, the registration manager 142 may create a printer ID and a printer key for a printer when the printer registers to the print server 102 for providing a cloud print service. The registration manager 142 may also allocate an email address for the printer during the registration process. In an example, the cloud print service is a web service available to web-enabled printers, for providing printing capabilities within the network 101.

In an example, the print job manager 152 may manage print jobs of the plurality of printers, such as printers 113-133, receive a print job request from a user terminal, and deliver the print job and content to be printed to a printer.

Figure 2:
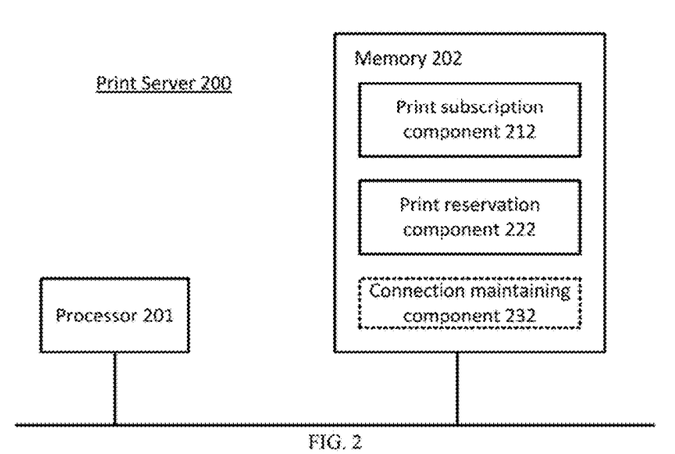
FIG. 2 is a schematic diagram illustrating the structure of a print server in accordance with an example of the present disclosure.

FIG. 2 is a schematic diagram illustrating the structure of a print server 200 in accordance with an example of the present disclosure. In an example, the print server 200 may include a processor 201, and a memory 202.

In an example, the processor 201 can execute instructions within the print server 200, including instructions stored in the memory 202. The processor 201 may be implemented as a chipset of chip(s) that include separate and multiple analog and digital processors.

The memory 202 may store information within the print server 200. In an example, the memory 202 is a volatile memory unit or units. In another example, the memory 202 is a non-volatile memory unit or units. The memory 202 may also be another form of computer-readable medium, such as a magnetic or optical disk.

In an example, the memory 202 may store instructions executable by the processor 201. The instructions may include a print subscription component 212 and a print reservation component 222.

In an example, the print subscription component 212 is to control printing by a print subscription user according to a first printing quota associated with the print subscription user. In an example, the first printing quota may be a quota for printing consumable or raw material. In an example, the first printing quota may be a color printing quota or a mono printing quota, for printing, copying or scanning documents over a predetermined period of time. For example, the first printing quota may be a printer page-count quota. In an example, print subscription may be subscription for ink, toner, or other marking agent such as charcoal or chalk, or other printing consumable, or raw material for 3D printing. The print subscription user may be a user that is subscribed to a print subscription service. Accordingly, the first printing quota may be a main quota related to the print subscription service, while the second printing quota may be a sub-quota of the main quota or a reserved portion of the main quota related to the print reservation service.

The print reservation component 222 is to reserve a second printing quota from the first printing quota for scheduled printing. The scheduled printing may be a print job scheduled by the print subscription user to be completed by use of a dedicated quota reserved from the main quota, as distinguished from common printing tasks not associated with a dedicated quota reserved from the main quota. In an example, the scheduled printing may be determined in advance to be completed at a preset time period in the future. The print subscription user may have the discretion to designate the scheduled printing, and the scheduled printing may be assigned a print reservation identity (or "print reservation ID" herein) by the print server 200. The print reservation ID is an ID associated with the second printing quota in the system illustrated in FIG. 1. In an example, the second printing quota may be a subset of the first printing quota. For example, the first printing quota is 200 pages per month, while the second printing quota is 50 pages within the month. In this way, enough pages may be allocated beforehand for the scheduled printing, thereby guaranteeing a print for a targeted future print request. In an example, the first or second printing quota may be presented in another form, such as amount of ink consumed.

In an example, the print reservation component 222 may receive a request to subscribe to a print reservation service. In an example, the request to subscribe may include a print subscription identity allocated to the print subscription user. Then, the print reservation component 222 may allocate a print reservation ID for the print subscription user in response to the determination that the print subscription user has the authorization to subscribe to the print reservation service, and record a subscription to the print reservation service for the print subscription user. In an example, the print reservation component 222 is to acquire an application identity (or "application ID" herein) from the request to subscribe, and compare the application ID with a prestored list of authorized application identities. In an example, the application ID is an ID for indicating a printing application issuing the request to subscribe. Accordingly, the print reservation component 222 may determine that the print subscription user has the authorization to subscribe to the print reservation service when the application ID is within the list.

In an example, the print reservation component 222 is to receive a request for creating a quota for the print reservation service, and reserve the second printing quota for the scheduled printing after determining that the print reservation ID has subscribed to the print reservation service. In an example, the print reservation ID and the second printing quota may be carried within the request for creating the quota. The print server 200 may store the relation between the print reservation ID and the second printing quota.

In an example, the print reservation component 222 is to receive a request for modifying a quota for the print reservation service, wherein the request for modifying the quota includes the print reservation ID and the second printing quota, and update the value of the second printing quota previously recorded in the print server 200.

In an example, the print reservation component 222 may receive a request for deleting a quota for the print reservation service. The request for deleting the quota may include the print reservation ID. The print reservation component 222 may delete the second printing quota for the print reservation ID according to the request for deleting the quota.

In an example, the print reservation component 222 is to: receive a request for unsubscribing from the print reservation service, wherein the request for unsubscribing includes the print reservation ID; and remove the subscription of the print reservation service for the print reservation ID.

In an example, the instructions further include: a connection maintaining component 232. The print subscription component 212 is to receive content to be printed when a condition for the scheduled printing is satisfied, trigger a printer via the connection maintaining component 232 to print the content, and subtract the amount of quota corresponding to the content from the second printing quota. In an example, the condition may be a predetermined time point for the scheduled printing. In an example, the print subscription component 212 may use the second printing quota in response to a determination that the received content is scheduled printing content. In an example, the print subscription component 212 may determine whether a print request received has a print reservation ID. If yes, the print request may be regarded as related to the print reservation service, and the received content may be printed using the second printing quota associated with the print reservation ID. In another example, the print subscription component 212 may detect whether the print request has an application ID associated with the second printing quota, and regard that the content for the print request may be printed using the second printing quota in response to the determination that there is the application ID in the print request.

In an example, the scheduled printing may be content to be printed on a day and time that a print subscription user chooses. For example, the scheduled printing may be a newspaper printable or daily puzzle, scheduled to be printed automatically from Monday through Friday between 7 a.m. and 8 a.m. Daily delivery of the content for the scheduled printing from a printing application to the print server 200 may be set up at a certain time. Accordingly, users can manage printing based on their habits and preferences, and prioritize their prints and get assurance of printing what they think is important to them. In an example, the scheduled printing may be designated in a web calendar or desktop calendar.

Figure 3:
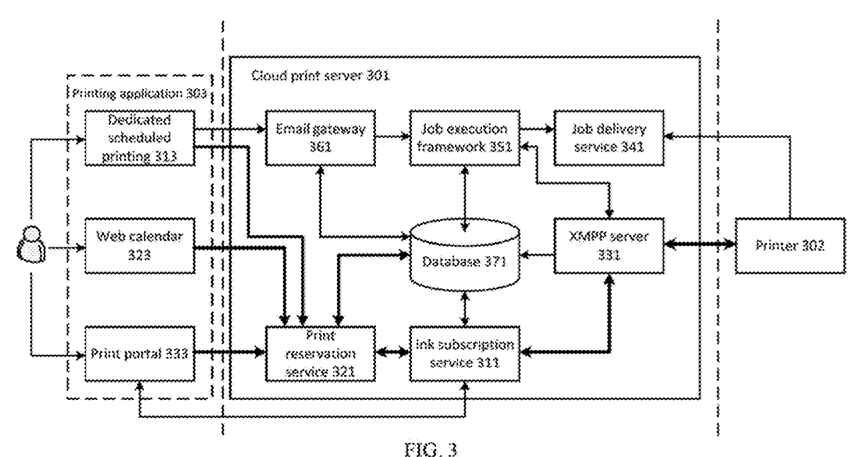
FIG. 3 illustrates a system for implementing cloud printing according to an example of the present disclosure.

FIG. 3 illustrates a system for implementing cloud printing according to an example of the present disclosure. The system includes a cloud print server 301, a cloud-aware printer 302, and printing applications 303 available by users. In an example, the printing applications 303 may be such as a dedicated scheduled printing 313, a web calendar 323, and a print portal 333 installed on the user terminals 114-144 illustrated in FIG. 1.

In an example, the cloud-aware printer 302 may communicate with the cloud print server 301 over the network 101. In this regard, the term "cloud" or "cloud-aware" may refer to the use of "cloud computing". Generally speaking, the cloud computing may include a style of computing in which computing resources such as application programs and file storage are remotely provided over a network such as the Internet, typically through a web browser. For example, many web browsers are capable of running applications, which can themselves be application programming interfaces (APIs) to more sophisticated applications running on remote servers. In an example, the cloud print server 301 is to create a cloud print service, allowing cloud-print-aware applications, either web, desktop, or mobile, stored on a device in the network cloud to print to a printer.

In an example, the cloud print server 301 includes an ink subscription service 311, a print reservation service 321, an XMPP server 331, a job delivery service 341, a job execution framework 351, an email gateway 361, and a database 371. While examples are described here in relation to ink, other examples may make subscription or reservation to other printing consumables (e.g., toner, 3D raw material, etc.).

In an example, the ink subscription service 311 may allow users to buy number of pages which they can print for a period of time. The ink subscription service 311 may monitor the ink level in users' printers. When the ink level in a printer goes below a predetermined threshold, replacement ink may be sent to the corresponding user. In this way, it may be ensured that the user will not run out of ink. In another example, the ink subscription service 311 may monitor the number of pages printed on a printer after the user has subscribed for a plan. Once the user has printed subscribed number of pages, the printer may stop printing unless the user makes supplemental subscription. With enablement of the ink subscription service 311, users may not have to face trivial bottlenecks, such as ink replacement, degradation of print-quality if one of ink cartridges gets emptied, or unable to figure out cost-to-print. When the ink subscription user enrolls in the ink subscription service 311, a monthly fee may be paid to print a defined number of pages per month. In an example, the plan may be based on the number of pages that is printed, or based on how many ink cartridges used.

In an example, the print reservation service 321 may provide control on: when-to-print, what-to-print, and how-much-to-print. In an example, the when-to-print function may be used for controlling whether a user wants to schedule the printing for one time or periodically. In an example, the what-to-print function may be used for controlling the content to be printed. For example, the content may be such as photocopy, documents attached to a calendar, documents specified in a dedicated scheduled printing 313, or documents shared by a white-listed partner or third party. In an example, the how-much-to-print may be used to enable an ink subscription user to control the number of pages which could be printed under various flows, such as a child safety lock, a white-list lock, a dedicated scheduled printing, a priority document printing, a calendar based printing, or a third party printing. The print reservation service 321 may provide a utilization of limited pages assigned in a month as per habits and preferences of users.

In an example, a user may give presentations a lot and want to get all related notes printed on scheduled time. The user may manage the printing by creating a calendar event for the presentations and the attached notes, so that the data may be printed before presentation. By using the print reservation service 321, the presentations of the user can be managed effectively and efficiently, and the user does not need to worry about tracking and managing the data printing. That is, the print reservation service 321 may assure that printing will happen on specified time for critical documents.

In an example, the XMPP server 331 may maintain a persistent connection to printers. The XMPP server 331 may enable real time communication between components of the cloud print server 301 and the printers 302. Print job notifications and controls are sent from the cloud print server 301 to the printers 302 over the connection. In an example, the printer 302 may also send events like Low-On-Ink (LOI) to the cloud print server 301 over the connection.

In an example, the job delivery service 341 may provide APIs for the printer 302 to register to the cloud print server 301. The job delivery service 341 may also take care of delivering content rendered by a user to the printer 302. In an example, a Hypertext Transfer Protocol (HTTP) may be used for supporting the communication between the cloud print server 301 and the printer 302.

In an example, the job execution framework (JEF) 351 may take care of getting a document rendered, sending a job notification to the printer 302, or monitoring the status of a print job on the printer 302 etc., once the print job is accepted by the email gateway 361. The JEF 351 may use an XMPP connection for communicating with the printer 302.

In an example, the email gateway 361 may provide APIs for submitting and managing print jobs for a user terminal, such as scanning a book, photocopying a document, or printing a drawing. The print jobs can be sent from the user terminal to a printer by sending an email with attachments to an email address of the printer. Printing applications 303 such as the dedicated scheduled printing 313 may use the email gateway 361 to transmit the print jobs to the printer 302 via the cloud print server 301.

In an example, the database 371 may store printer related information for the cloud print server 301. The printer related information may be printer capabilities sent from the printer 302 to the cloud print server 301 during registration of the printer 302. The print capabilities may define how documents for the printer 302 may be rendered and delivered. The print capabilities may also define paper size, color or black & white printing, etc.

In an example, an ink subscription user may initiate an external printing application 303 to sign up to the print reservation service 321 directly or indirectly. In an example, the printing application 303 can manipulate the sub-quota out of the main quota by creating a new sub-quota, modifying an existing sub-quota, or deleting an existing sub-quota. These are capabilities capable of being used by end users to create experience expected by the users.

In an example, the ink subscription user may sign-up for the dedicated scheduled printing 313, which could trigger the dedicated scheduled printing 313 to create a sub-quota for scheduled printing. The dedicated scheduled printing 313 may create the sub-quota by first subscribing for print reservation over the cloud print server 301. That is, the dedicated scheduled printing 313 may consume capabilities provided by the print reservation service 321 to reserve a portion of pages from the subscribed fixed number of pages for printing expected documents under scheduled printing. In another example, if the ink subscription user unsubscribes from the dedicated scheduled printing 313, then the dedicated scheduled printing 313 may remove the sub-quota previously created and unsubscribe from the print reservation service 321 over the cloud print server 301. In an example, a user may enjoy solving a certain type of puzzle. The user may set scheduled printing under the dedicated scheduled printing 313, and avoid manually track and management of preferential printing for the puzzle. The dedicated scheduled printing 313 can calculate approximate pages required for the puzzles print over the month.

In an example, the web calendar 323 may want to block pages for scheduled printing of documents, which the ink subscription user may have attached under a scheduled calendar event. The web calendar 323 can calculate approximate number of pages required for printing a document attached with the calendar event. Other time management application may be used for the scheduled printing, such as a desktop calendar.

In an example, the print portal 333 may be used for registering and managing information about printers and print jobs. The information includes an email address, printer preferences, and status for print jobs of a printer. In an example, the print portal 333 may be a website provided by the cloud print server 301.

Figure 4:
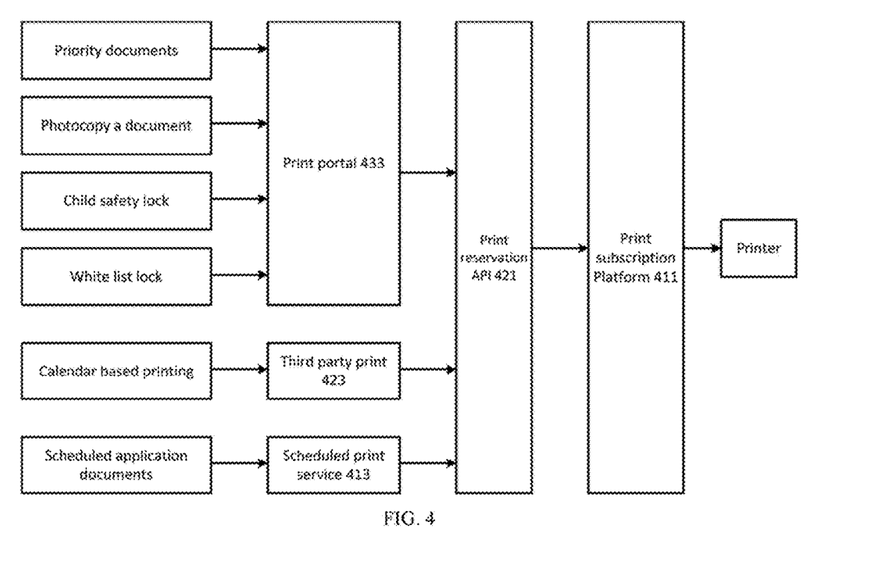
FIG. 4 illustrates scenarios of using printing applications for print reservation according to an example of the present disclosure.

FIG. 4 illustrates scenarios of using printing applications for print reservation according to an example of the present disclosure. In an example, the print reservation component 222 shown in FIG. 2 may expose print reservation APIs 421 accessible to printing applications.

In an example, the print reservation APIs 421 may include: CreateQuota(NumberOfPages, PrintResID), ModifyQuota(NumberOfPages, PrintResID), DeleteQuota (PrintResID), SubscribeForQuota(PrintSubscriptionID), and UnsubscribeFromQuota(PrintResID). In an example, the PrintSubscriptionID may be a parameter indicating an identity allocated to users when they subscribe to a print subscription service. In another example, the SubscribeForQuota API may have a form of SubscribeForQuota (PrintSubscriptionID, AppID). In the example, the AppID may be an application ID of a printing application initiating the subscription of the print reservation service. The print reservation APIs 421 may enable the printing applications to create and manipulate sub-quotas out of main quotas. That is, the printing applications on top of a print subscription platform 411 can use the print reservation APIs 421 to create the sub-quota out of the main quota assigned to the print subscription user. In an example, the UnsubscribeFromQuota API may be used by a printing application such as a web calendar, which wants to discontinue usage of the print reservation service for the print subscription user. That is, the printing application can remove or end the association by sharing the print reservation ID to the print server through the UnsubscribeFromQuota API. After the print reservation service has been unsubscribed, the unused amount of the sub-quota associated with the print reservation ID may be released to the main quota. In an example, the CreateQuota API, the ModifyQuota API, the DeleteQuota API can be used by the printing application to manipulate the sub-quota out of the main quota, and associate the sub-quota with the specific print reservation ID.

Details required for the printing applications to be eligible for subscription may be provided during the usage of the print reservation APIs 421. Specifically, the printing applications may include a scheduled print service 413, a third party print 423, and a print portal 433. In an example, the scheduled print service 413 may be a printing application offered by providers of a cloud print service or a print subscription service. The third party print 423 may be a print application offered by providers independent of the cloud print service, such as other application providers.

In an example, the scheduled print service 413 may use the SubscribeForQuota API to subscribe to the print reservation service for the print subscription user. Then, number of pages needed to allocate for printing a certain type of content (e.g., a given type of puzzle) can be reserved by the scheduled print service 413 using the CreateQuota API. Using the ModifyQuota API, the DeleteQuota API, and the UnsubscribeFromQuota API, the scheduled print service 413 may control print behaviors as per users' choices. In an example, the scheduled print service 413 may provide printable content to the print subscription platform 411 periodically as per user's preference. For example, a user can schedule the printing of unsolved puzzles one-time or on daily, weekly or on custom days of week.

In an example, number of pages needed to allocate for document print can also be reserved by the third party print 423 using the print reservation APIs 421. In an example, an education institution web site may share scheduled lecture notes and assignments to the third party print 423 of a print subscription user. Then, the lecture notes may be printed using the sub-quota reserved by the print subscription user.

In an example, the print portal 433 may be used in cases where print subscription users require critical documents or documents to meet a deadline to be printed in times to come. For example, in a family, a child may want to print for either school-assignments or just for fun. Elders may want to print leisure content while an office-goer may want to do printing related to office work or for critical meetings. This may lead to preferential printing. In other words, since number of pages available to print is limited over a given period, like in a month, a print subscription user may try to categorize the printing in some preferential order. That is, some printing activities may take precedence over the others, especially when there are limited pages to print in a given cost. Functions like child safety lock and white list lock provided in the print portal 433 may give the print subscription user more freedom to allow other users, such as children or white-listed, to print freely, without worrying about them consuming overall print quota assigned to the print subscription user. In this way, the allocated quota of prints may be used by the print subscription user more effectively.

Figure 5:
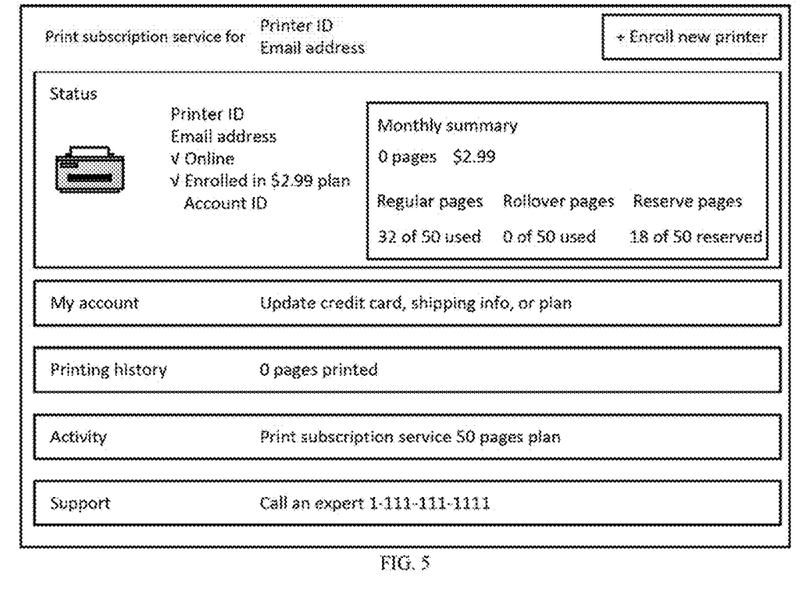
FIG. 5 is a screenshot of a print portal providing the print reservation service in accordance with an example of the present disclosure.

FIG. 5 is a screenshot of a print portal providing the print reservation service to a user terminal in accordance with an example of the present disclosure. In an example, the print portal may include a graphical user interface (GUI) for presenting the first printing quota and the second printing quota. Specifically, the graphical user interface of the print portal is shown in FIG. 5, presenting information of the print subscription service. For example, it is shown in FIG. 5 that 50 pages are subscribed, and 18 of the 50 pages are reserved for scheduled printing.

In an example, a printing method deployed on a cloud printing platform is proposed. The cloud printing platform may include a plurality of print servers. The printing method may be an end-to-end solution called print reservation, which takes leverage of a print subscription platform and other print services available under the cloud print service. In an example, the printing method can allocate, control and manipulate a subset of pages out of a main quota assigned to a user for a given time cycle under a print subscription service.

Figure 6:
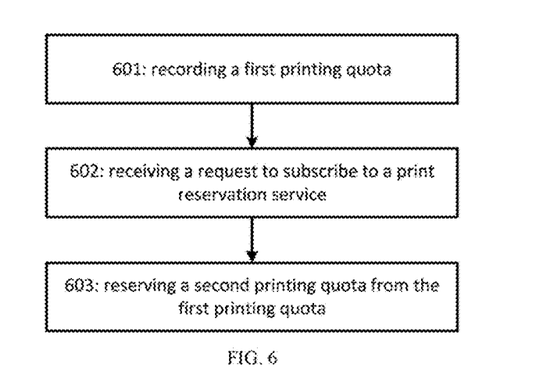
FIG. 6 is a flowchart illustrating operations of a print server for providing print reservation in accordance with an example of the present disclosure.

FIG. 6 is a flowchart illustrating an example of implementations of a print service. In an example, the method may be implemented by a computer, such as a print server, for providing print reservation. At block 601, a first printing quota subscribed by a print subscription user may be recorded in the print server. The first printing quota may be the maximum quota for printing subscribed within a predetermined period. At block 602, a request to subscribe to a print reservation service is received. At block 603, a second printing quota from the first printing quota for scheduled printing may be reserved. That is, the second printing quota is dedicated for designated printing. In an example, the request to subscribe may include a print subscription identity. The print server may allocate a print reservation ID for the print subscription user in response to the determination that the print subscription user has the authorization to subscribe to the print reservation service. In an example, it is determined that the print subscription user has the authorization when the print subscription identity is valid. In another example, the request to subscribe may further include an application ID of a printing application initiating the request to subscribe. Accordingly, the print server may acquire the application ID from the request to subscribe, and compare the application ID with a prestored list of authorized application identities. Thereafter, it is determined that the print subscription user has the authorization when the application ID is within the prestored list.

In an example, the print server may receive a request for creating a quota for the print reservation service. The request for creating the quota includes a print reservation ID and the amount of the second printing quota (e.g., number of pages). Thereafter, the print server may reserve the second printing quota (from the first printing quota) for the scheduled printing after determining that the print reservation ID has subscribed to the print reservation service. In an example, the second printing quota may be associated with the print reservation ID and/or the application ID. After the second printing quota is created, the print server may subtract the amount of the second printing quota from the first printing quota to get a remaining printing quota, and track the remaining printing quota for general printing. Here, the general printing may refer to other printing tasks of the print subscription user different from the scheduled printing.

In an example, the print server may receive a print request including content to be printed, and determine whether the print request relates to the scheduled printing associated with the print reservation service. In an example, the print request may include a print reservation ID and/or an application ID, to indicate that this print relates to the print reservation service, and is to use a specific sub-quota previously created and associated with the print reservation ID and/or application ID. In an example, different print reservation IDs or application IDs may identify different sub-quotas. In response to the determination that the print request relates to the print reservation service, the print server may instruct the printer to print the content, and subtract the amount of quota corresponding to the content from the second printing quota. That is, based on the application ID and/or print reservation ID included in the print request, the print server may figure out that the content of the print request be printed by use of the second printing quota. After the printing, the print server may subtract a certain amount from the second printing quota, to record the consumption of the second printing quota.

In an example, when the print request includes a print subscription ID, without any print reservation ID or application ID, the print server may determine that this print is to use the remaining printing quota (i.e., the portion of the quota not reserved in any sub-quota). In an example, the determination is made by the print subscription component. In response to the determination that the print is not related to the print reservation service, the print server may instruct a printer to print the content, and subtract the amount of quota corresponding to the content from the remaining printing quota. The remaining printing quota is the difference between the first printing quota and any other sub-quotas, such as the second printing quota in this example.

In an example, the request to subscribe to the print reservation service is received from a printing application selected from the group including a scheduled print application, a third party print application, and a print portal. In an example, the third party print application may be a time management application such as a web calendar application, or a desktop calendar application.

Figure 7:
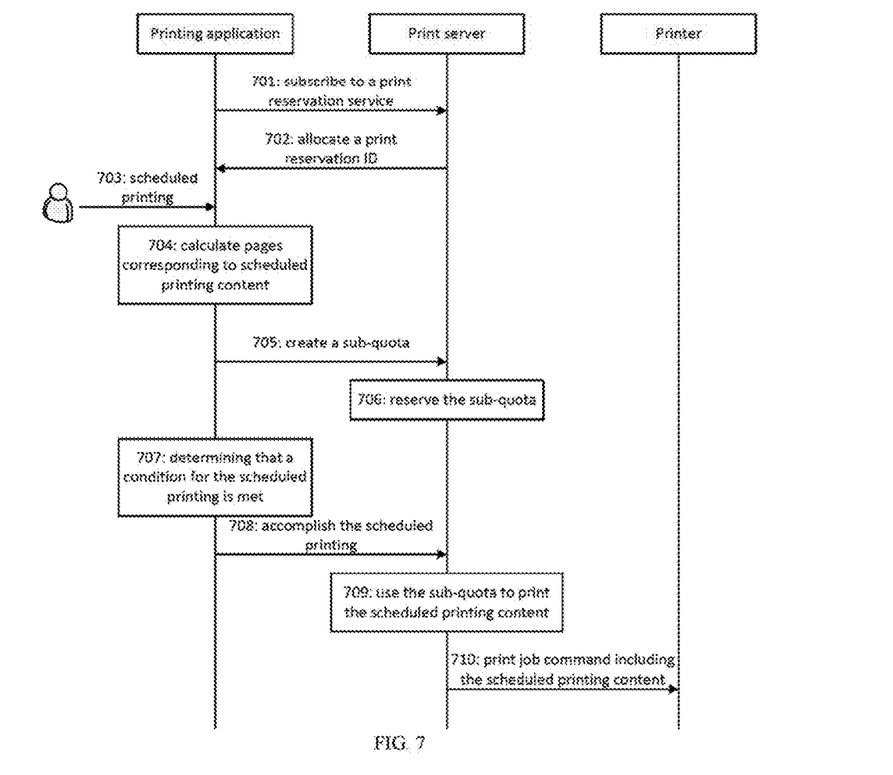
FIG. 7 illustrates interactions among a print server, printers, and printing applications in accordance with an example of the present disclosure.

FIG. 7 illustrates interactions among the print server 301, the printer 302, and the printing application 303 shown in FIG. 3 in accordance with an example of the present disclosure. The interaction is to reserve pages for the printing application 303 over a print reservation ID. On successful subscription, the printing application 303 may get the print reservation ID for further communication with the print server 301 (blocks 701-702). In an example, the print reservation ID may be allocated and recognized by the print server 301. After receiving an instruction from a print subscription user for scheduled printing (block 703), the printing application 303 may calculate approximate pages required to reserve for the scheduled printing asked by the print subscription user (block 704). The printing application 303 may request the print server 301 to create a sub-quota for the print reservation ID (block 705). The request for creating the sub-quota may include the print reservation ID and the sub-quota calculated. At block 706, the print server 301 may reserve the sub-quota. On successful creation of the sub-quota, the printing application 303 may start using it for the scheduled printing expected by the print subscription user. In an example, when a condition for the scheduled printing is met, the printing application 303 may request the print server 301 to accomplish the scheduled printing (blocks 707-708), such as via a print request. In an example, the condition may be a certain time set beforehand for the scheduled printing, such as from 7 a.m. to 8 a.m. every Monday. In some examples, the printing application 303 may provide, to the print server 301, an application ID identifying the printing application 303 or a print reservation ID identifying the quota reserved for the printing application 303, either in the print request or associated with the print request. For example, the print request may be an email, and a header of the email may specify the application ID of the printing application 303 or the print reservation ID. In response to the print request, the print server 301 may determine that the print request is associated with (e.g., includes) an application ID or a print reservation ID and in response, may instruct the printer 302 to use the sub-quota associated with the application ID or print reservation ID to print the scheduled printing content (blocks 709-710). The value of the sub-quota associated with the application ID or print reservation ID may decrease after each scheduled printing, indicating that corresponding amount of quota is consumed. Further, the printing application 303 may modify the sub-quota, or delete the sub-quota when the print subscription user wants to discontinue, and unsubscribe itself from the print reservation service.

In an example, it is assumed that user A has subscribed to a print subscription service, and has a corresponding print subscription ID. For example, the print subscription ID may be "UserASubscriptionID". User A may be allowed to use "UserASubscriptionID" to print at most 100 pages every month through a registered printer. Further, user A may subscribe to a print reservation service by use of the print subscription ID, and be allocated a print reservation ID for further usage.

In an example, user A may create an entry on a web calendar, and attach a document with 5 pages for scheduled printing. Specifically, the web calendar may request user A to input the print subscription ID, and request a print reservation platform to allow using the print reservation service. Meanwhile, the web calendar may set an event for monitoring when the time for the scheduled printing may arrive. The event may be periodic or have a one-time event trigger. In an example, the web calendar may make a call to a print server via a SubscribeForQuota API. The SubscribeForQuota API may include "UserASubscriptionID" and an application ID of the web calendar. In an example, the application ID of the web calendar may be "WebCallID". The print server may check whether the web calendar can use the print reservation service. In an example, the print server may store a list of application IDs authorized for subscribing to the print reservation service. Accordingly, when the print server determines that the web calendar has the authorization to use the print reservation service according to "WebCallID", the print server may generate a print reservation ID for user A. The print reservation ID is unique for indicating a subscription of the print reservation service of user A. For example, the print reservation ID of user A may be UserAWebCalPrintResID.

After the subscription of the print reservation service, the web calendar may have rights to designate a sub-quota out of the main quota of 100 pages. Specifically, the web calendar may make another call to the print server via a CreateQuota API. A format of the CreateQuota API may be CreateQuota API(5, UserAWebCalPrintResID). This may create a sub-quota of 5 pages out of 100, which is associated with a scheduled printing through the web calendar having the application ID "WebCallID". The association among the sub-quota of 5 pages, and any of the application ID and the print reservation ID may be recorded in the print server. When the time arrives for the event to trigger, the web calendar may initiate a print request to the print server, including the print reservation ID of user A and/or the application ID of the web calendar.

The print server may identify the print request triggered by the web calendar. Also, based on the print reservation ID or application ID associated with the print request, the print server may identify the sub-quota with which the print request is associated (e.g., the quota associated with "UserAWebCalPrintResID" or "WebCallID"), and reduce that sub-quota of 5 to 0 once printing is done successfully (e.g., reduce the sub-quota associated with UserAWebCalPrintResID or WebCallID from 5 to 0).

In an example, user A may subscribe to the print reservation service by use of a dedicated scheduled print application named RoverApp, for scheduled printing of a puzzle (1 page) every day. The RoverApp may request the print server to allow using the print reservation service. The RoverApp may request user A to share the print subscription ID, and then request the print server by making a call via a SubscribeForQuota API. The SubscribeForQuota API may include parameters such as "UserASubscriptionID" and an application ID of the RoverApp. In an example, the application ID of the RoverApp may be "RoverAppID". The print server may check whether the RoverApp can use the print reservation service or not. If yes, the print server may generate a unique print reservation ID for the subscription. In an example, the print reservation ID may be UserARoverAppPrintResID. In an example, different print reservation IDs, such as UserAWebCalPrintResID and UserARoverAppPrintResID, may refer to different scheduled printing subscriptions to the print reservation service, and have different sub-quotas.

After the subscription, the RoverApp may have rights to make a sub-quota out of the main quota of 95 pages. The main quota has been changed from 100 pages to 95 pages because 5 pages have already been allocated to the web calendar. Specifically, the RoverApp may make another call to the print server via a CreateQuota API. The CreateQuota API may have a form of CreateQuota(30, UserARoverAppPrintResID). This procedure may create a sub-quota of 30 pages out of the 95 pages remained. The sub-quota of 30 pages is associated with scheduled printing through the RoverApp. In an example, the print server may store the relation between UserARoverAppPrintResID and the sub-quota of 30 pages. In another example, the relation among UserARoverAppPrintResID, the sub-quota of 30 pages, and RoverAppID may be saved on the print server for the scheduled printing. In another example, the relation between the sub-quota of 30 pages and RoverAppID may be saved.

The RoverApp may initiate a print request every day for printing the puzzle. The print server may identify the print request triggered by the RoverApp according to the application ID of the RoverApp included in the print request. In this way, anonymous print request may not be handled by the print server to improve safety of cloud printing, for example. Thereafter, the print server may identify the sub-quota to which this print is associated to based on a print reservation ID (e.g., UserARoverAppPrintResID) or application ID included in (or associated with) the print request, and reduce the sub-quota of 30 by 1 once the scheduled printing is done successfully.

Figure 8:
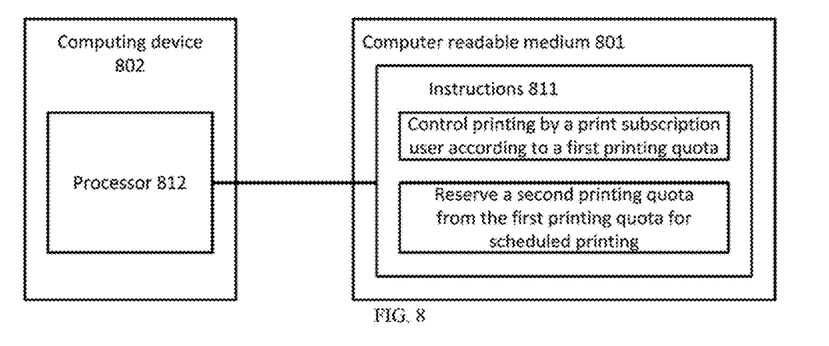
FIG. 8 is a block diagram illustrating computer readable medium storing instructions to provide print reservation according to an example of the present disclosure.

FIG. 8 is a block diagram illustrating computer readable medium 801 storing instructions 811 to provide print reservation according to an example of the present disclosure. In an example, the instructions 811 can be read by a processor 812 within a computing device 802 to perform part or all of the operations described in such as FIGS. 1-7. In an example, the computer readable medium 801 may be a magnetic disk storage device, a flash memory device, or other non-volatile or non-transitory solid state memory devices.

In an example, the instructions 811 may be to cause the processor 812 to: control printing by a print subscription user according to a first printing quota associated with the print subscription user, and reserve a second printing quota from the first printing quota for scheduled printing.

In an example, the instructions 811 may be to cause the processor 812 to: receive a request to subscribe to a print reservation service, the request to subscribe including a print subscription identity of the print subscription user, allocate a print reservation ID for the print subscription user in response to the determination that the print subscription user has the authorization to subscribe to the print reservation service; and record a subscription to the print reservation service for the print subscription user.

In an example, the instructions 811 may be to cause the processor 812 to: receive a request for creating a quota for the print reservation service, the request for creating the quota including the print reservation ID and the second printing quota; and reserve the second printing quota for the scheduled printing after determining that the print reservation ID has subscribed to the print reservation service.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the present disclosure and its practical applications, to thereby enable others skilled in the art to best utilize the present disclosure and various examples with various modifications as are suited to the particular use contemplated. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A print server, comprising: a processor, a memory, and instructions stored on the memory and executable by the processor;

the instructions comprising:

a print subscription component, to control printing by a print subscription user according to a first printing quota associated with the print subscription user; and a print reservation component, to:

reserve a second printing quota from the first printing quota for scheduled printing;

receive a request to subscribe to a print reservation service, the request to subscribe including a print subscription identity of the print subscription user;

allocate a print reservation identity for the scheduled printing of the mint subscription user in response to the determination that the print subscription user has the authorization to subscribe to the print reservation service; and record a subscription to the print reservation service for the print subscription user.

2. The print server according to claim 1, wherein the determination that the print subscription user has the authorization to subscribe to the print reservation service comprises:

acquiring an application identity from the request to subscribe;

comparing the application identity with a prestored list of authorized application identities; and determining that the print subscription user has the authorization to subscribe to the print reservation service when the application identity is within the list.

3. The print server according to claim 1, wherein the print reservation component is to:

receive a request for creating or modifying a quota for the print reservation service, the request for creating or modifying the quota including the print reservation identity and the second printing quota; and record the second printing quota for the print reservation identity according to a value of the second printing quota included in the request for creating or modifying after determining that the print reservation identity has subscribed to the print reservation service.

4. The print server according to claim 3, wherein the print reservation component is to:

receive a request for deleting a quota for the print reservation service, the request for deleting the quota including the print reservation identity; and delete the second printing quota for the print reservation identity in response to the request for deleting.

5. The print server according to claim 1, wherein the print reservation component is to:

receive a request for unsubscribing from the print reservation service, the request for unsubscribing including the print reservation identity; and remove the subscription to the print reservation service for the print reservation identity in response to the request for unsubscribing.

6. The print server according to claim 1, wherein the instructions further comprise: a connection maintaining component; and the print subscription component is to receive content to be printed and, in response to a determination that the received content is scheduled printing content associated with the second printing quota, trigger a printer via the connection maintaining component to print the content, and subtract an amount of quota corresponding to the content from the second printing quota.

7. A computer implemented method for providing print reservation, comprising:

recording a first printing quota associated with a print subscription user, the first printing quota being a maximum printing quota associated with the print subscription user for printing within a predetermined period;

receiving a request to subscribe to a print reservation service;

reserving a second printing quota from the first printing quota for scheduled printing associated with the print reservation service;

receiving a request for creating a quota for the print reservation service, the request for creating the quota including a print reservation identity and the second printing quota; and reserving the second printing quota for the scheduled printing after determining that the print reservation identity has subscribed to the print reservation service.

8. The method according to claim 7, further comprising:
receiving a print request including content to be printed;
determining whether the print request relates to the scheduled printing associated with the print reservation service; and
instructing a printer to print the content, and subtracting an amount of quota corresponding to the content from a remaining printing quota in response to determining that the print request is not related to the scheduled printing, the remaining printing quota being the difference between the first printing quota and at least the second printing quota.

9. The method according to claim 7, further comprising:
receiving a print request including content to be printed;
determining whether the print request relates to the scheduled printing associated with the print reservation service; and
in response to determining that the print request relates to the scheduled printing, instructing the printer to print the content, and subtracting an amount of quota corresponding to the content from the second printing quota.

10. The method according to claim 7, wherein the request to subscribe to the print reservation service is received from a printing application selected from the group comprising a scheduled print application, a third party print application, and a print portal.

11. The method according to claim 10, wherein the print portal comprises a graphical user interface for presenting the first printing quota and the second printing quota.

12. A non-transitory computer readable medium storing instructions executable by a processor, wherein the instructions are to cause the processor to:

control printing by a print subscription user according to a first printing quota associated with the print subscription user;

reserve a second printing quota from the first printing quota for scheduled printing;

receive a request to subscribe to a print reservation service, the request to subscribe including a print subscription identity of the print subscription user;

allocate a print reservation identity for the scheduled printing of the print subscription user in response to the determination that the print subscription user has the authorization to subscribe to the print reservation service; and record a subscription to the print reservation service for the print subscription user.

* * * * *

UNITED STATES PATENT AND TRADEMARK OFFICE
CERTIFICATE OF CORRECTION

PATENT NO. : 10,185,524 B2
APPLICATION NO. : 15/544684
DATED : January 22, 2019
INVENTOR(S) : Dhanendra Jain et al.

Page 1 of 1

It is certified that error appears in the above-identified patent and that said Letters Patent is hereby corrected as shown below:

In the Claims

In Column 14, Line 8, Claim 1, delete "mint" and insert -- print --, therefor.

Signed and Sealed this
Twenty-sixth Day of November, 2019

Andrei Iancu
*Director of the United States Patent and Trademark Office*